US012623516B2

(12) United States Patent
Veenman

(10) Patent No.: US 12,623,516 B2
(45) Date of Patent: May 12, 2026

(54) DRIVER MONITORING SYSTEM WITH AN ELECTRO-OPTIC SUN VISOR

(71) Applicant: Gentex Corporation, Zeeland, MI (US)

(72) Inventor: Steven J. Veenman, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 43 days.

(21) Appl. No.: 18/529,352

(22) Filed: Dec. 5, 2023

(65) Prior Publication Data

US 2024/0198768 A1 Jun. 20, 2024

Related U.S. Application Data

(60) Provisional application No. 63/433,518, filed on Dec. 19, 2022.

(51) Int. Cl.
*B60J 3/02* (2006.01)
*B60K 35/60* (2024.01)
*B60K 35/65* (2024.01)

(52) U.S. Cl.
CPC ............. *B60J 3/0204* (2013.01); *B60K 35/60* (2024.01); *B60K 35/654* (2024.01); *B60K 2360/25* (2024.01); *B60K 2360/33* (2024.01); *B60K 2360/777* (2024.01); *B60K 2360/779* (2024.01)

(58) Field of Classification Search
CPC .... B60J 3/0204; B60K 35/00; B60K 2360/25; B60K 2360/777; B60K 2360/33; B60K 2360/779; B60K 35/60; B60K 35/654

USPC .......................................................... 348/148
See application file for complete search history.

(56) References Cited

U.S. PATENT DOCUMENTS

| | | | |
|---|---|---|---|
| 6,666,493 B1 * | 12/2003 | Naik ...................... | B60J 3/0204 |
| | | | 296/97.4 |
| 10,556,490 B2 * | 2/2020 | Li ........................... | B60J 3/0208 |
| 2006/0193046 A1 * | 8/2006 | Yellin ...................... | E06B 9/24 |
| | | | 359/488.01 |
| 2012/0018989 A1 * | 1/2012 | Breed ................. | B60R 21/0152 |
| | | | 280/735 |
| 2013/0141578 A1 * | 6/2013 | Chundrlik, Jr. ........... | B60R 1/04 |
| | | | 348/148 |
| 2016/0114731 A1 * | 4/2016 | Habibi .................... | G02F 1/157 |
| | | | 345/173 |
| 2021/0239974 A1 * | 8/2021 | Musat ..................... | G02F 1/163 |
| 2022/0105786 A1 * | 4/2022 | Larry ..................... | G02F 1/163 |

(Continued)

*Primary Examiner* — Matthew David Kim
(74) *Attorney, Agent, or Firm* — Price Heneveld LLP; Brian James Brewer

(57) ABSTRACT

A monitoring system for an automobile includes at least one illumination source that is configured to project a first illumination type towards a driver location. At least one imaging device is configured to capture the first illumination type at the driver location. A visor assembly includes a stowed position and an articulated position. The visor assembly in the articulated position obscures at least part of the first illumination type from the driver location. An electro-optic device is located in the visor assembly and is configured to switch between a transmissive state and a darkened state. The first illumination type passes through the electro-optic device in the transmissive state and the darkened state, and a second illumination type passes through the electro-optic device in the transmissive state but is blocked in the darkened state.

16 Claims, 6 Drawing Sheets

(56)         References Cited

U.S. PATENT DOCUMENTS

| | | | |
|---|---|---|---|
| 2022/0159361 A1* | 5/2022 | LeBoeuf | A61B 5/6817 |
| 2022/0250588 A1* | 8/2022 | Schmalenberg | B60S 1/64 |
| 2022/0250589 A1* | 8/2022 | Schmalenberg | B60S 1/64 |
| 2022/0410671 A1* | 12/2022 | McKnight | B60J 3/0208 |
| 2023/0176386 A1* | 6/2023 | Kim | G06F 3/04815 |
| | | | 345/8 |
| 2023/0302994 A1* | 9/2023 | Miller | B60R 1/04 |
| 2023/0339297 A1* | 10/2023 | Najaf | B60J 3/04 |

* cited by examiner

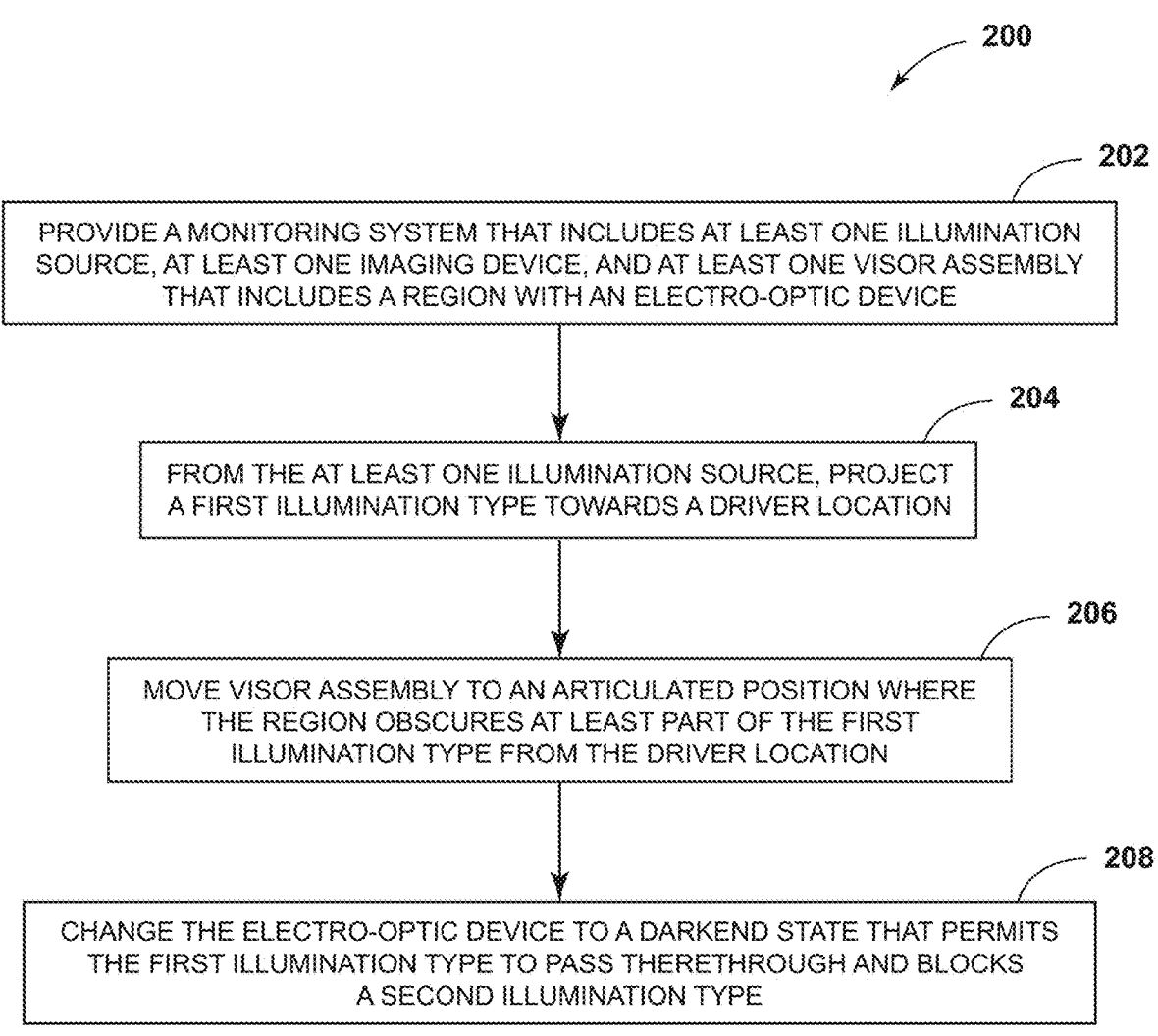

200

202

PROVIDE A MONITORING SYSTEM THAT INCLUDES AT LEAST ONE ILLUMINATION SOURCE, AT LEAST ONE IMAGING DEVICE, AND AT LEAST ONE VISOR ASSEMBLY THAT INCLUDES A REGION WITH AN ELECTRO-OPTIC DEVICE

204

FROM THE AT LEAST ONE ILLUMINATION SOURCE, PROJECT A FIRST ILLUMINATION TYPE TOWARDS A DRIVER LOCATION

206

MOVE VISOR ASSEMBLY TO AN ARTICULATED POSITION WHERE THE REGION OBSCURES AT LEAST PART OF THE FIRST ILLUMINATION TYPE FROM THE DRIVER LOCATION

208

CHANGE THE ELECTRO-OPTIC DEVICE TO A DARKEND STATE THAT PERMITS THE FIRST ILLUMINATION TYPE TO PASS THERETHROUGH AND BLOCKS A SECOND ILLUMINATION TYPE

FIG. 6

DRIVER MONITORING SYSTEM WITH AN ELECTRO-OPTIC SUN VISOR

CROSS-REFERENCE TO RELATED APPLICATION

This application claims priority to and the benefit under 35 U.S.C. § 119(e) of U.S. Provisional Application No. 63/433,518, filed on Dec. 19, 2022, entitled "DRIVER MONITORING SYSTEM WITH AN ELECTRO-OPTIC SUN VISOR," the disclosure of which is hereby incorporated herein by reference in its entirety.

FIELD OF THE DISCLOSURE

The present disclosure generally relates to a monitoring system, and more particularly to a monitoring system within a vehicle with an electro-optic sun visor.

SUMMARY OF THE DISCLOSURE

According to an aspect of the present disclosure, a monitoring system for an automobile includes an illumination source that is configured to project a first illumination type towards a driver location. An imaging device is configured to capture the first illumination type at the driver location. A visor assembly includes a stowed position and an articulated position. The visor assembly in the articulated position obscures at least part of the first illumination type from the driver location. An electro-optic device is located in the visor assembly and is configured to switch between a transmissive state and a darkened state. The first illumination type passes through the electro-optic device in the transmissive state and the darkened state, and a second illumination type passes through the electro-optic device in the transmissive state but is blocked in the darkened state.

According to another aspect of the present disclosure, a monitoring system for an automobile includes an illumination source configured to project a first illumination type within an infrared or a near-infrared spectrum towards a driver location. An imaging device is configured to capture the first illumination type at the driver location. A visor assembly includes a stowed position and an articulated position, the articulated position obscuring at least part of the first illumination type from the driver location. An electro-optic device is located in the visor assembly and configured to switch between a transmissive state and a darkened state. The first illumination type passes through the electro-optic device in the transmissive state and the darkened state and a second illumination type within the visible spectrum passes through the electro-optic device in the transmissive state but is blocked in the darkened state.

According to yet another aspect of the present disclosure, a monitoring system for an automobile includes an illumination source configured to project a first illumination type towards a driver location. An imaging device is configured to capture the first illumination type at the driver location. A visor assembly includes a stowed position and an articulated position, the articulated position obscuring at least part of the first illumination type from the driver location. A sensor is configured to detect if the visor assembly is in the stowed position or the articulated position. An electro-optic device is in operable communication with the sensor and located in the visor assembly. A filter is located in the visor assembly, the filter is configured to transmit the first illumination type and block a second illumination type.

These and other features, advantages, and objects of the present disclosure will be further understood and appreciated by those skilled in the art by reference to the following specification, claims, and appended drawings.

BRIEF DESCRIPTION OF THE DRAWINGS

In the Drawings:

FIG. 6 is a method flow chart of a process of utilizing a driver monitoring system that includes a visor assembly according to one aspect of the present disclosure.

DETAILED DESCRIPTION

Figure 1:
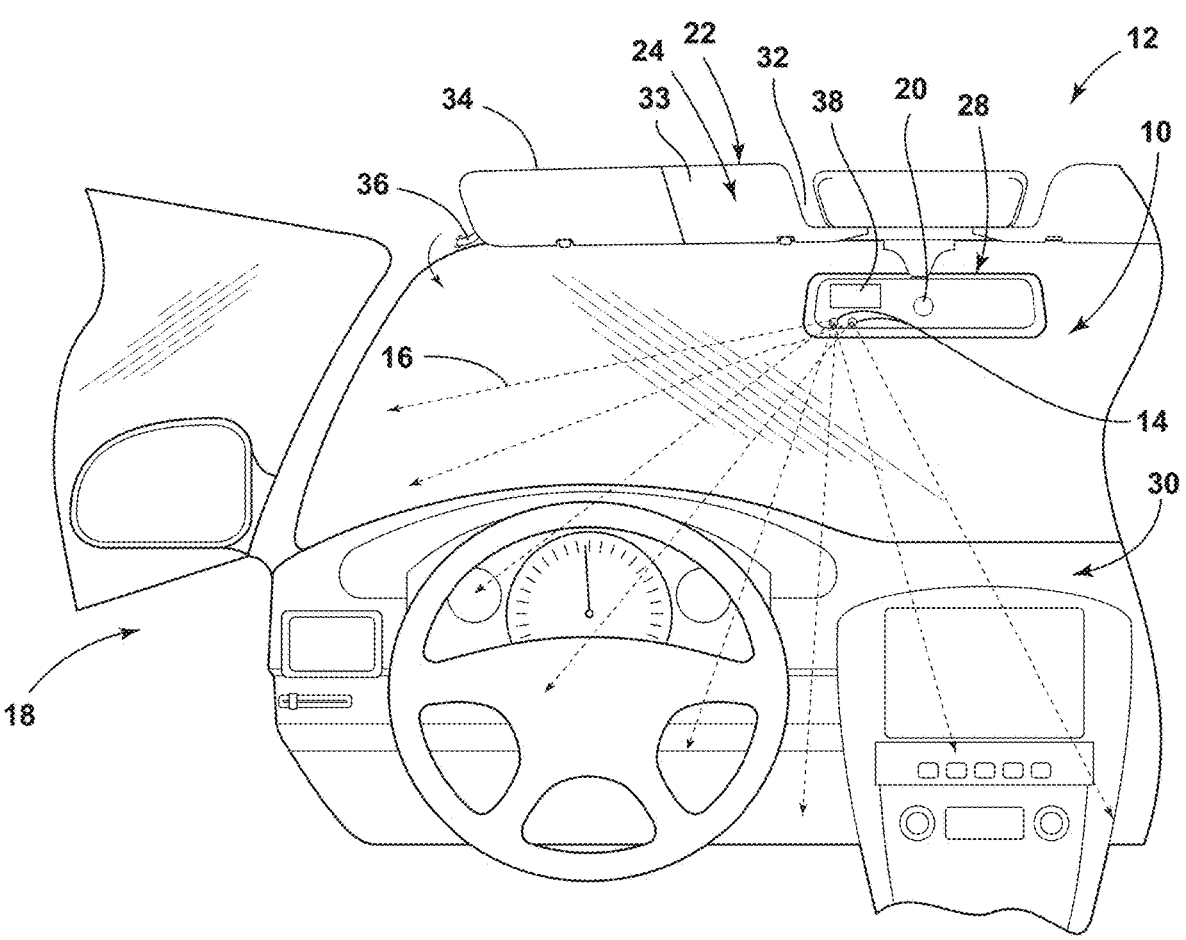
FIG. 1 is an interior perspective view of an automobile with a monitoring system that includes a visor assembly in a stowed position according to one aspect of the present disclosure.

The present illustrated embodiments reside primarily in combinations of method steps and apparatus components related to a monitoring system within a vehicle with an electro-optic sun visor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
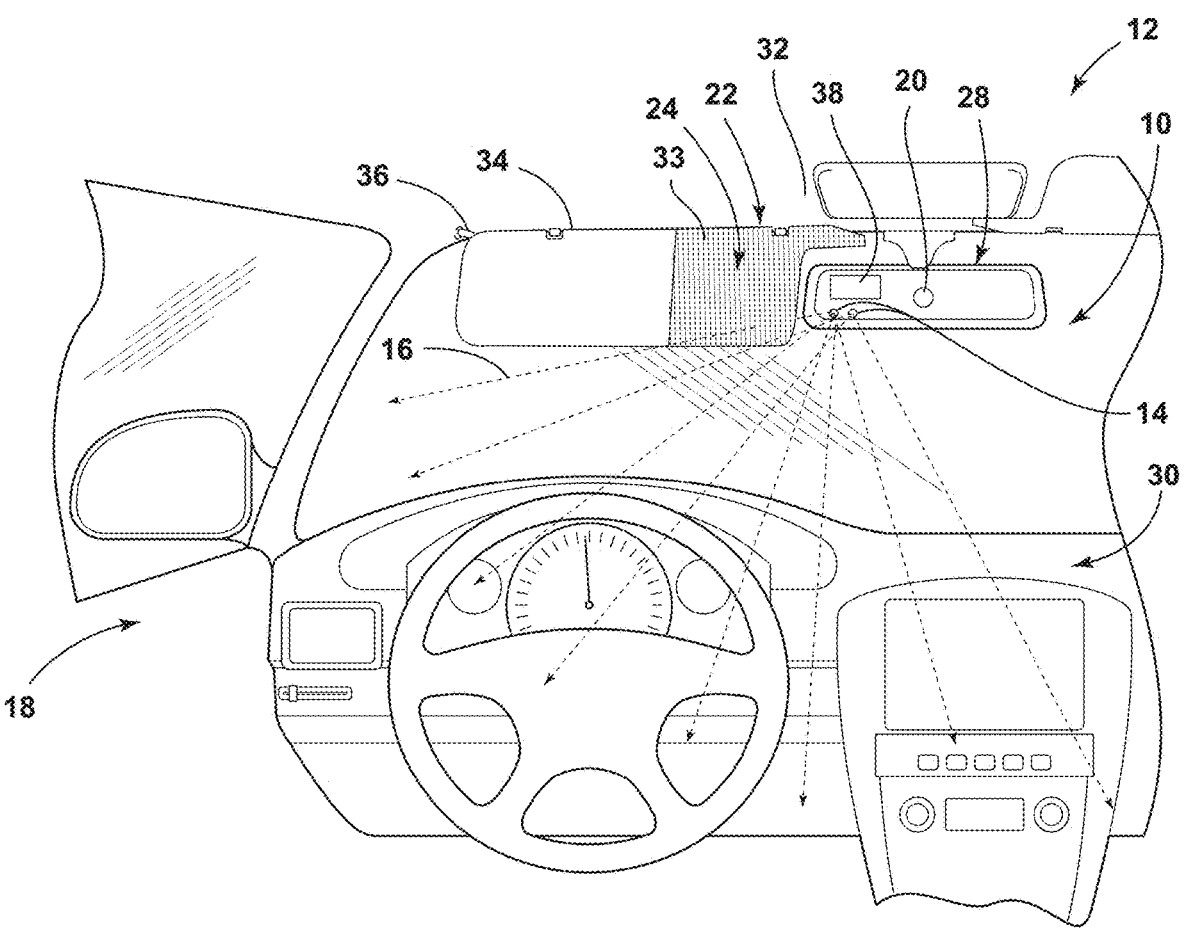
FIG. 2 is an interior perspective view of an automobile with a monitoring system that includes a visor assembly in an articulated position according to one aspect of the present disclosure.
Figure 3:
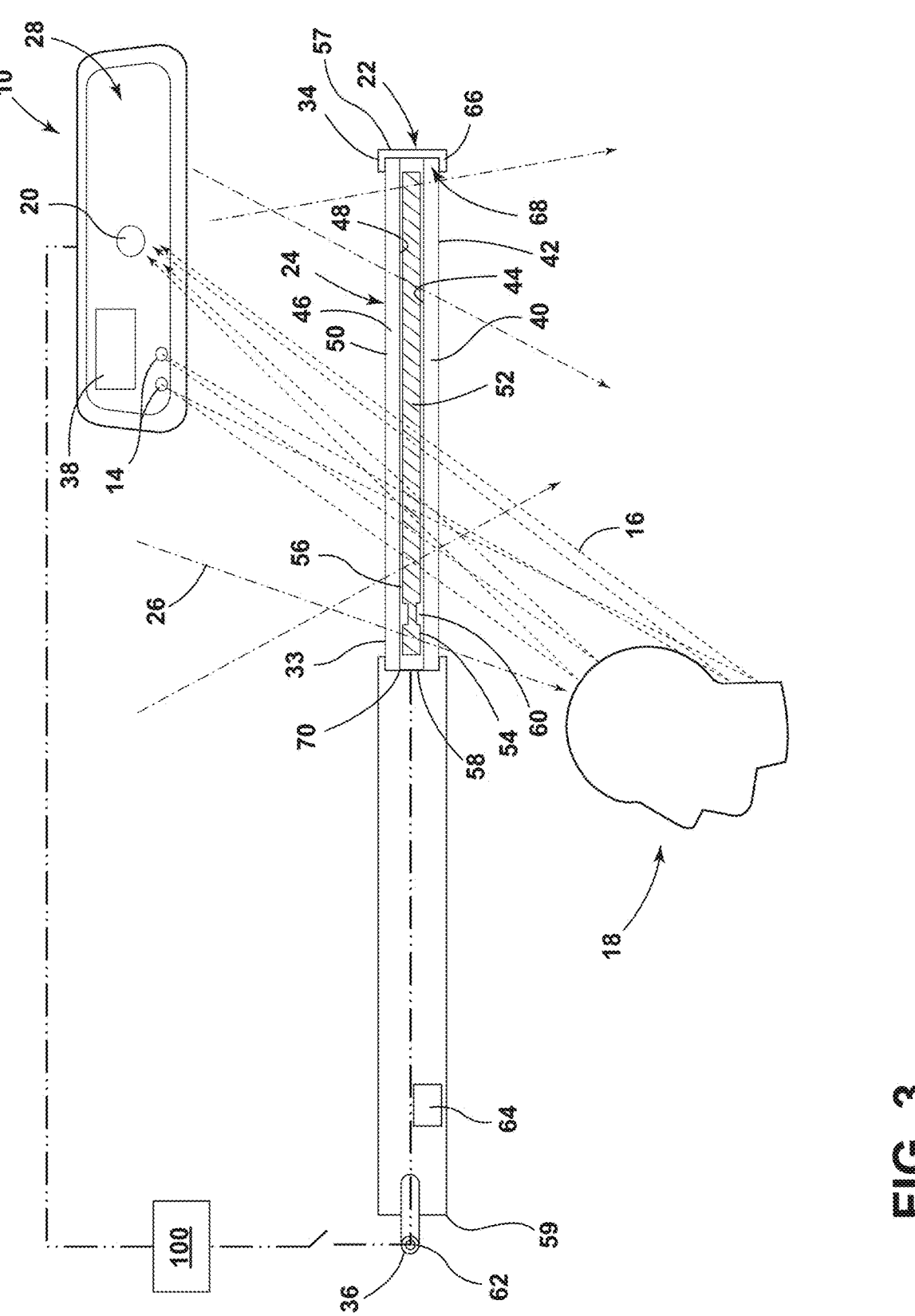
FIG. 3 is a schematic view of a visor assembly in a transmissive state according to one aspect of the present disclosure.
Figure 4:
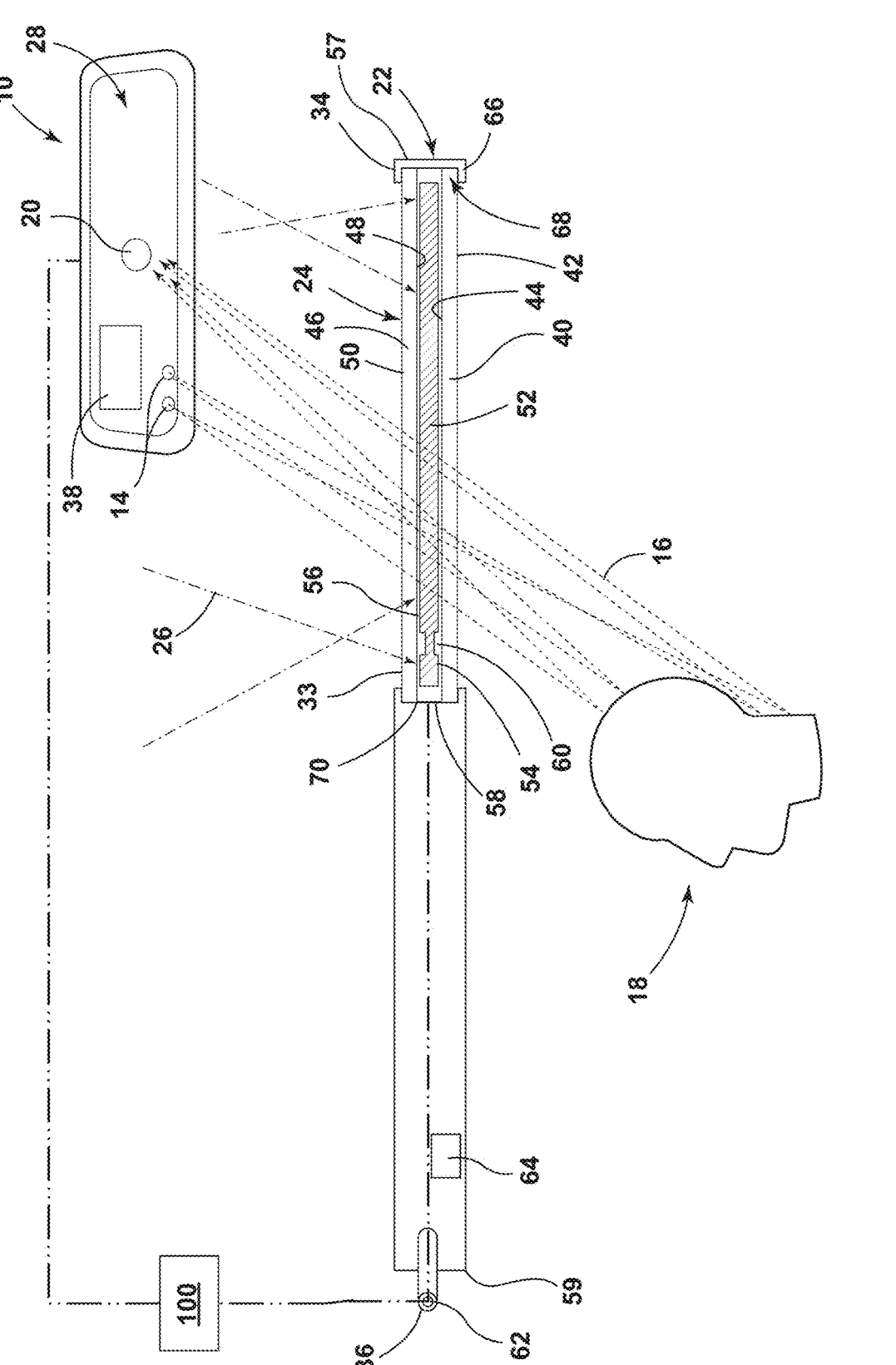
FIG. 4 is a schematic view of a visor assembly in a darkened state according to one aspect of the present disclosure.

Referring initially to FIGS. 1-4, reference numeral 10 generally designates a monitoring system for an automobile 12. The monitoring system 10 includes at least one illumination source 14 that is configured to project a first illumination type 16 towards a driver location 18. At least one imaging device 20 is configured to capture the first illumination type 16 at the driver location 18. A visor assembly 22 includes a stowed position (FIG. 1) and an articulated position (FIG. 2). The visor assembly 22 in the articulated position obscures at least part of the first illumination type 16 from the driver location 18. A filter, such as an electro-optic device 24 is located in the visor assembly 22 and is configured to switch between a transmissive state (FIG. 3) and a darkened state (FIG. 4). The first illumination type 16 passes through the electro-optic device 24 in the transmissive state and the darkened state, and a second illumination type 26 (FIGS. 3 and 4) passes through the electro-optic device 24 in the transmissive state but is blocked in the darkened state. The electro-optic device 24 further includes a range of intermediate states between the transmissive state and the darkened state that progressively block more of the second illumination type 26 as the electro-optic device 24 reaches the darkened state (i.e., the fully darkened state). In this manner, the amount of the second illumination type 26 that passes through the visor assembly 22 may be adjusted between fully blocked (e.g., little to no visibility), partially blocked (e.g., partial visibility), and unblocked (e.g., full visibility).

With reference now to FIGS. 1 and 2, the monitoring system 10 may be incorporated into various structures of the automobile 12. For example, the at least one illumination source 14 (e.g., one, two, or more illumination sources 14) may be incorporated into a rearview mirror assembly 28. The at least one imaging device 20 (e.g., one, two, or more imaging devices 20) may also be located in the rearview mirror assembly 28. In operation, the illumination source 14 is oriented to project the first illumination type 16 towards the driver location 18 (e.g., a driver's seat). The first illumination type 16 may include infrared or near-infrared illumination. While the illumination source 14 may be located in other portions of an interior cabin 30 of the automobile 12 (e.g., the upper paneling 32), when the visor assembly 22 is moved to the articulated position, at least part of the first illumination type 16 is obscured by a region 33 within an outer perimeter 34 of the visor assembly 22. In this manner, at least part of the first illumination type 16 that is projected by the illumination source 14 must pass through the region 33 of the visor assembly 22 in order to illuminate portions of the driver location 18. As such, the electro-optic device 24 is located in the region 33 to allow the first illumination type 16 to pass through and illuminate the driver location 18 when the visor assembly 22 is in the articulated position while simultaneously selectively blocking the second illumination type 26. More particularly, the second illumination type 26 may include ambient light in the visible spectrum that can negatively impact vision of the driver.

It is contemplated that the monitoring system 10 may incorporate other types of filters than the electro-optic device 24 in the region 33. The filter may be dynamic and include a transmissive state and a darkened state of certain wavelengths. In some embodiments, the filter may include a static state that is opaque to certain wavelengths. For example, in some embodiments, a near-infrared cut-off filter or a long wavelength band-pass filter may be utilized within the region 33. In some embodiments, substantially the entire visor assembly 22 is formed of the filter or, alternatively, the electro-optic device 24. In some embodiments, the visor assembly 22 (e.g., at least the region 33) is formed of a Poly(methyl methacrylate) ("PMMA") or a polycarbonate material with a dye additive. The dye additive may be selected to transmit and block light within specific wavelength spectrums. The filter may be substantially transmissive at wavelengths above a spectrum between about 800 nm and about 940 nm and substantially opaque at wavelengths below the spectrum of between about 800 nm and about 940 nm. For example, the filter may be substantially transmissive at wavelengths above about 800 nm and substantially opaque at wavelengths below about 800 nm.

With reference now to FIGS. 1-4, the visor assembly 22 may include a connection member 36 that couples the visor assembly 22 to the interior cabin 30. The monitoring system 10 is configured to acquire information from the environment, such as information about the driver (e.g., head position, hand position, the position of other body parts, or actions of the driver). The monitoring system 10 acquires the information by obtaining depth, contour, or movement information as a result of the imaging device 20 capturing images of the first illumination type 16 reflected from surfaces within the interior cabin 30. The monitoring system 10 may include a communication module 38 (e.g., a display) for conveying information to the driver and/or a control system of the automobile 12.

With reference now to FIGS. 3 and 4, the electro-optic device 24 may include a first substrate 40 defining a first element surface 42 and a second element surface 44. The electro-optic device 24 may further include a second substrate 46 spaced away from the first substrate 40 and defining a third element surface 48 and a fourth element surface 50. An electroactive medium 52 is positioned between the first and second substrates 40, 46. A first electrode layer 54 may be located on the second element surface 44 and a second electrode layer 56 may be located on the third element surface 48 to effectively sandwich the electro-optic medium 52 therebetween. A seal 58 extends between the second element surface 44 and the third element surface 48 to confine the electro-optic medium 52 between the first substrate 40 and the second substrate 46. In various examples, the electro-optic medium 52 may include at least one solvent, at least one anodic material, and at least one cathodic material. Typically, both of the anodic and cathodic materials are electroactive and at least one of them may be electrochromic. It will be understood that regardless of its ordinary meaning, the term "electroactive" may mean a material that undergoes a modification in its oxidation state upon exposure to a particular electrical potential difference facilitated by the first electrode layer 54 and the second electrode layer 56.

The visor assembly 22 extends between a first side 57 nearest the illumination source 14 and a second side 59 furthest from the illumination source 14. In some embodiments, the electro-optic device 24 is located on the first side 57 of the visor assembly closest to the illumination source 14 (e.g., the rearview mirror assembly 28). In some embodiments, the connection member 36 is located proximate the second side 59. A distance is defined between the first side 57 and the second side 59. In some embodiments, the electro-optic device 24 is spaced from the second side 59 by at least ¼ of the distance between the first side 57 and the second side 59. For example, the electro-optic device 24 is spaced from the second side 59 by at least ⅛ of the distance, at least ¼ of the distance, ½ of the distance, or ¾ of the distance.

An electric bus 60 may at least partially travel in close proximity to the seal 58. For example, the electric bus 60 may include a conductive adhesive, tape, and/or the like, that may include a higher electric conductivity than one of or both of the first electrode layer 54 and the second electrode layer 56. The electric bus 60 may be placed on the first electrode layer 54 and the second electrode layer 56.

With continued reference to FIGS. 3 and 4, the electro-optic device 24 may be in communication with a control system 100. In some embodiments, the control system 100 is located within the visor assembly 22 and/or the rearview mirror assembly 28. In some embodiments, the electro-optic device 24 is electrically connected to the control system 100 through a channel 62 within the connection member 36. The visor assembly 22 may further include one or more sensors 64 for determining if the visor assembly 22 is in the stowed position or the articulated position. Additionally, or alternatively, to the sensors 64, the monitoring system 10 may be configured to determine if the visor assembly 22 is in the articulated position. In this manner, the electro-optic device 24 may only be electro-activated when the visor assembly 22 is in the articulated position. In some embodiments, the electro-optic device 24 is automatically electro-activated when the visor assembly 22 is in the articulated position. In some embodiments, the electro-optic device 24 is electro-activated based on input from a driver/user. At least part of the outer perimeter 34 of the visor assembly 22 may include a bezel 66 that defines a track 68 for locating an outer periphery 70 of the electro-optic device 24. The track 68 may have a depth such that the bezel 66 at least partially conceals the seal 58 in the electro-optic device 24.

Figure 5:
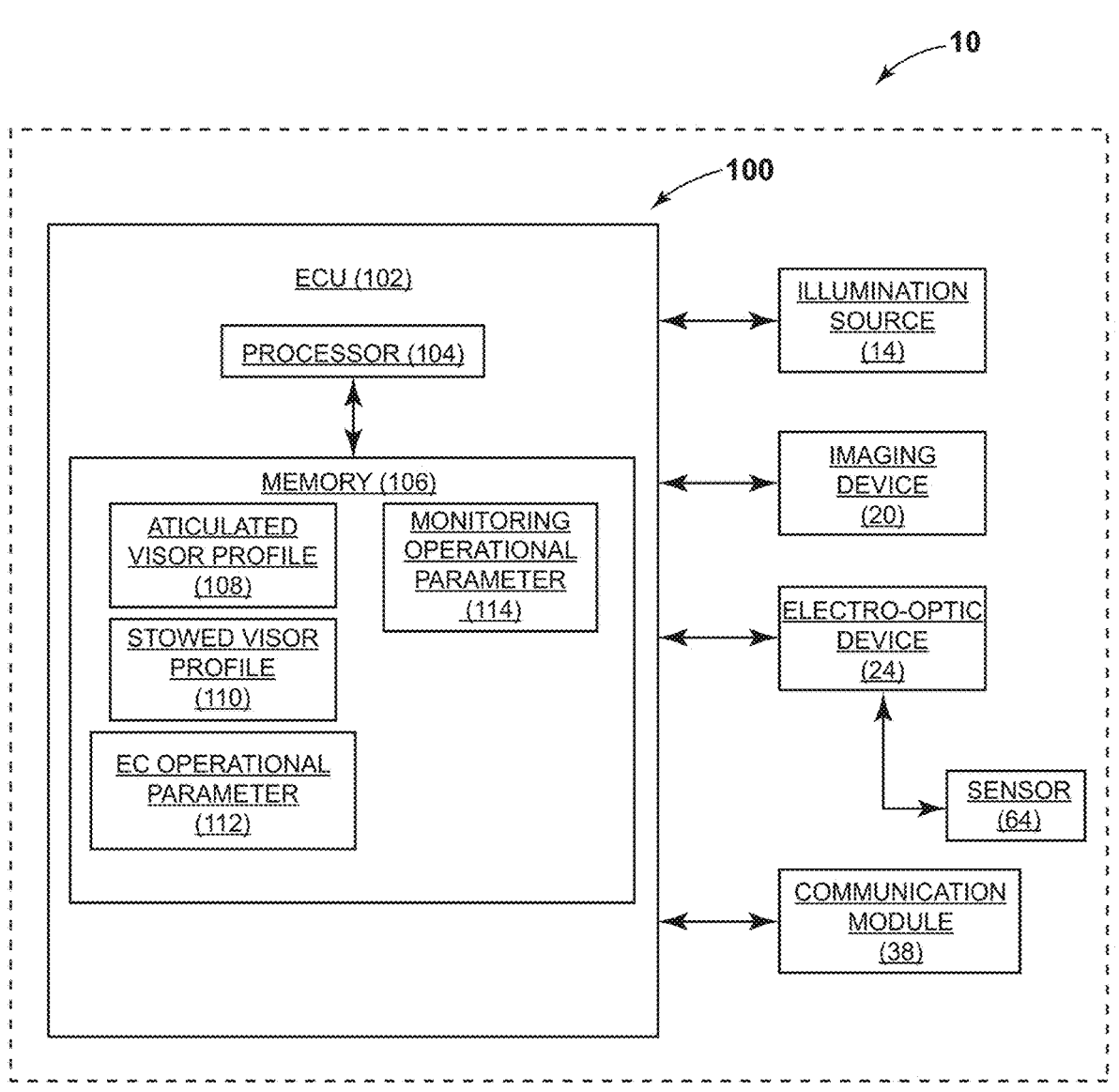
FIG. 5 is a schematic view of a control system of a monitoring system according to one aspect of the present disclosure.

With reference now to FIG. 5, the control system 100 of the monitoring system 10 may include at least one electronic control unit (ECU) 102. The at least one ECU 102 may be located in the visor assembly 22, the rearview mirror assembly 28, and/or other locations in the automobile 12. In some embodiments, components of the ECU 102 are located in both the visor assembly 22 and the rearview mirror assembly 28. The at least one ECU 102 may include a processor 104 and a memory 106. The processor 104 may include any suitable processor 104. Additionally, or alternatively, each ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid state) memory, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 104, cause the processor 104 to, at least, perform the functions associated with the components of the monitoring system 10. The at least one illumination source 14, the at least one imaging device 20, the electro-optic device 24, and the communication module 38 may, therefore, be controlled by the control system 100. The memory 106 may, therefore, include an articulated visor profile 108, a stowed visor profile 110, an electro-optic device ("EC") operational parameter data 112, and a monitoring operational parameter data 114.

In accordance with FIGS. 1-5, a method 200 of operating a driver monitoring system is illustrated in FIG. 6. By reference numeral 202, the method includes providing a monitoring system 10 that includes at least one illumination source 14, at least one imaging device 20, and at least one visor assembly 22 that includes a region 33 with an electro-optic device 24. At step 204, the illumination source 14 projects a first illumination type 16 towards a driver location 18. At step 206, the visor assembly 22 is moved to an articulated position where the region 33 obscures at least part of the first illumination type 16 from the driver location 18. At step 208, the electro-optic device 24 is changed to a darkened state that permits the first illumination type 16 to pass therethrough and that blocks a second illumination type 26. Step 208 may happen automatically upon moving the visor assembly 22 to the articulated position. In some embodiments, at step 208, the electro-optic device 24 is prevented from changing to a darkened state when the visor assembly 22 is in a stowed position.

The disclosure is further summarized in the following paragraphs and is further characterized by combinations of any and all of the various aspects described therein.

According to one aspect of the present disclosure, a monitoring system for an automobile includes an illumination source that is configured to project a first illumination type towards a driver location. An imaging device is configured to capture the first illumination type at the driver location. A visor assembly includes a stowed position and an articulated position. The visor assembly in the articulated position obscures at least part of the first illumination type from the driver location. An electro-optic device is located in the visor assembly and is configured to switch between a transmissive state and a darkened state. The first illumination type passes through the electro-optic device in the transmissive state and the darkened state, and a second illumination type passes through the electro-optic device in the transmissive state but is blocked in the darkened state.

According to another aspect, a first illumination type includes illumination in an infrared or near-infrared spectrum.

According to yet another aspect, a second illumination type includes illumination in a visible spectrum.

According to yet another aspect, an electro-optic device is configured to be inactive in a transmissive state when a visor assembly is in a stowed position.

According to still yet another aspect, an electro-optic device is configured to be electrically-activated in a darkened state when a visor assembly is in an articulated position.

According to another aspect, a visor assembly includes an outer perimeter and an electro-optic device is located within the outer perimeter.

According to yet another aspect, at least one of the illumination source or the imaging device is located in a rearview mirror assembly.

According to another aspect of the present disclosure, a monitoring system for an automobile includes an illumination source configured to project a first illumination type within an infrared or a near-infrared spectrum towards a driver location. An imaging device is configured to capture the first illumination type at the driver location. A visor assembly includes a stowed position and an articulated position, the articulated position obscuring at least part of the first illumination type from the driver location. An electro-optic device is located in the visor assembly and configured to switch between a transmissive state and a darkened state. The first illumination type passes through the electro-optic device in the transmissive state and the darkened state and a second illumination type within the visible spectrum passes through the electro-optic device in the transmissive state but is blocked in the darkened state.

According to another aspect, an electro-optic device is configured to be inactive in a transmissive state when a visor assembly is in a stowed position.

According to yet another aspect, an electro-optic device is configured to be electrically-activated in a darkened state when a visor assembly is in an articulated position.

According to still yet another aspect, at least one of the illumination source or the imaging device is located in a rearview mirror assembly.

According to another aspect, a visor assembly includes an outer perimeter and an electro-optic device is located within the outer perimeter.

According to yet another aspect, an electro-optic device is located on a first side of the visor assembly closest to a rearview mirror assembly.

According to still yet another aspect, an electro-optic device is spaced from a second side of a visor assembly that furthest from a rearview mirror assembly by at least ¼ of a distance between a first side and the second side.

According to yet another aspect of the present disclosure, a monitoring system for an automobile includes an illumination source configured to project a first illumination type towards a driver location. An imaging device is configured to capture the first illumination type at the driver location. A visor assembly includes a stowed position and an articulated position, the articulated position obscuring at least part of the first illumination type from the driver location. A sensor is configured to detect if the visor assembly is in the stowed position or the articulated position. A filter is located in the visor assembly, the filter is configured to transmit the first illumination type and block a second illumination type.

According to another aspect, a first illumination type includes illumination in an infrared or near-infrared spectrum.

According to yet another aspect, a second illumination type includes illumination in a visible spectrum.

According to still yet another aspect, a filter includes a static state that constantly transmits a first illumination type and blocks a second illumination type.

According to another aspect, a filter is dynamic and includes a transmissive state and a darkened state, wherein a first illumination type passes through the filter in the transmissive state and the darkened state and a second illumination type is within a visible spectrum and passes through the filter in the transmissive state but is blocked in the darkened state.

According to yet another aspect, at least one of the illumination source or the imaging device is located in a rearview mirror assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A monitoring system for an automobile comprising:

an illumination source located in a rearview mirror assembly and configured to project a first illumination type within an infrared or a near-infrared spectrum towards a driver location;

an imaging device configured to capture the first illumination type at the driver location;

a visor assembly including an outer perimeter and having a front surface opposite a rear surface, the visor assembly moveable relative to the imaging device between a stowed position and an articulated position, the articulated position obscuring at least part of the first illumination type from the driver location; and an electro-optic device located in the visor assembly on a first side of the visor assembly that is closest to the rearview mirror assembly but spaced from the second side of the visor assembly that is opposite the first side and at least partially defining the front and rear surfaces, the electro-optic device configured to switch between a transmissive state and a darkened state, wherein the first illumination type passes through the portions of the front and rear surfaces defined by the electro-optic device in the transmissive state and the darkened state and a second illumination type passes through the portions of the front and rear surfaces defined by the electro-optic device in the transmissive state but is blocked in the darkened state.

2. The monitoring system of claim 1, wherein the second illumination type includes illumination in a visible spectrum.

3. The monitoring system of claim 2, wherein the electro-optic device is configured to be automatically inactive in the transmissive state when the visor assembly is in the stowed position.

4. The monitoring system of claim 3, wherein the electro-optic device is configured to be automatically electrically-activated in the darkened state when the visor assembly is in the articulated position.

5. The monitoring system of claim 1, wherein the electro-optic device is spaced from the second side of the visor assembly furthest from the rearview mirror assembly by at least ⅛ of a distance between the first side and the second side.

6. The monitoring system of claim 1, wherein the imaging device is located in the rearview mirror assembly.

7. A monitoring system for an automobile comprising:

an illumination source located in a rearview mirror assembly and configured to project a first illumination type within an infrared or a near-infrared spectrum towards a driver location;

an imaging device configured to capture the first illumination type at the driver location;

a visor assembly including an outer perimeter, the visor assembly including a stowed position and an articulated position, the articulated position obscuring at least part of the first illumination type from the illumination source in the rearview mirror assembly; and an electro-optic device located in the visor assembly on a first side of the visor assembly that is closest to the rearview mirror assembly but spaced from the second side of the visor assembly that is opposite the first side, the electro-optic device is configured to switch between a transmissive state and a darkened state, wherein the first illumination type passes through the electro-optic device in the transmissive state and the darkened state and a second illumination type within a visible spectrum passes through the electro-optic device in the transmissive state but is blocked in the darkened state.

8. The monitoring system of claim 7, wherein the electro-optic device is configured to be inactive in the transmissive state when the visor assembly is in the stowed position.

9. The monitoring system of claim 7, wherein the electro-optic device is configured to be electrically-activated in the darkened state when the visor assembly is in the articulated position.

10. The monitoring system of claim 7, wherein the imaging device is located in the rearview mirror assembly.

11. The monitoring system of claim 7, wherein the electro-optic device is spaced from the second side of the visor assembly furthest from the rearview mirror assembly by at least ⅛ of a distance between the first side and the second side.

12. The monitoring system of claim 11, wherein the electro-optic device is spaced from the second side of the visor assembly furthest from the rearview mirror assembly by at least ¼ of a distance between the first side and the second side.

13. A monitoring system for an automobile comprising:

an illumination source located in a rearview mirror assembly and configured to project a first illumination type within an infrared or near-infrared spectrum towards a driver location;

an imaging device configured to capture the first illumination type at the driver location;

a visor assembly including an outer perimeter, the visor assembly including a stowed position and an articulated position, the articulated position obscuring at least part of the first illumination type from the driver location;

a sensor configured to detect if the visor assembly is in the stowed position or the articulated position; and an electro-optic device located in the visor assembly on a first side of the visor assembly that is closest to the rearview mirror assembly but spaced from the second side of the visor assembly that is opposite the first side, the electro-optic device is configured to switch between a transmissive state and a darkened state, wherein the first illumination type passes through the electro-optic device in the transmissive state and the darkened state and a second illumination type within a visible spectrum passes through the electro-optic device in the transmissive state but is blocked in the darkened state.

14. The monitoring system of claim 13, wherein the electro-optic device is spaced from the second side of the visor assembly furthest from the rearview mirror assembly by at least ⅛ of a distance between the first side and the second side.

15. The monitoring system of claim 14, wherein the electro-optic device is spaced from the second side of the visor assembly furthest from the rearview mirror assembly by at least ¼ of a distance between the first side and the second side.

16. The monitoring system of claim 13, wherein the imaging device is located in the rearview mirror assembly.

* * * * *